(12) United States Patent
Mayer

(10) Patent No.: US 7,239,358 B1
(45) Date of Patent: Jul. 3, 2007

(54) TELEVISION RECEIVER FOR DIGITAL SIGNALS WITH OFFSET TUNING PROVISIONS

(75) Inventor: Matthew Thomas Mayer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 717 days.

(21) Appl. No.: 10/031,155

(22) PCT Filed: Jul. 13, 2000

(86) PCT No.: PCT/US00/19103

§ 371 (c)(1),
(2), (4) Date: Jan. 14, 2002

(87) PCT Pub. No.: WO01/06768

PCT Pub. Date: Jan. 25, 2001

Related U.S. Application Data

(60) Provisional application No. 60/144,415, filed on Jul. 16, 1999.

(51) Int. Cl.
*H04N 5/50* (2006.01)

(52) U.S. Cl. .................... 348/731; 348/21; 348/725

(58) Field of Classification Search ............ 348/21, 348/731, 725, 726; 455/296, 307, 265–266, 455/339–340, 192.1, 192.2, 257, 260; 375/326–327, 375/339, 344, 376
See application file for complete search history.

(56) References Cited

U.S. PATENT DOCUMENTS

| | | | |
|---|---|---|---|
| 5,739,874 A * | 4/1998 | Badger et al. ............. | 348/731 |
| 5,748,226 A * | 5/1998 | Limberg .................... | 348/21 |
| 5,805,241 A | 9/1998 | Limberg .................... | 348/725 |
| 5,893,025 A * | 4/1999 | Bessho et al. ............. | 725/151 |
| 5,940,143 A | 8/1999 | Igarashi et al. ........... | 348/678 |
| 6,108,044 A * | 8/2000 | Shin ......................... | 348/555 |
| 6,226,049 B1 * | 5/2001 | Oh ............................ | 348/607 |
| 6,281,946 B1 * | 8/2001 | Hisada et al. ............. | 348/725 |
| 6,388,701 B1 * | 5/2002 | Lee .......................... | 348/21 |
| 6,622,308 B1 * | 9/2003 | Raiser ....................... | 725/151 |

FOREIGN PATENT DOCUMENTS

| | | |
|---|---|---|
| DE | 3616987 | 12/1986 |
| EP | 0903937 | 3/1999 |
| EP | 0903937 B1 | 2/2004 |
| JP | 11-055142 | 2/1999 |
| JP | 11-098037 | 4/1999 |
| WO | 99/05796 | 2/1999 |

* cited by examiner

*Primary Examiner*—Trang Tran
(74) *Attorney, Agent, or Firm*—Joseph J. Laks; Robert D. Shedd; Brian J. Cromarty

(57) ABSTRACT

A television receiver for receiving digital and analog signals that reduces adjacent channel interference when receiving digital signals susceptible to interference caused by a lower adjacent NTSC signal. Upon receiving the digital signal, the receiver heterodynes the digital signal with a local oscillator (LO) signal to produce an intermediate frequency (IF) signal. A microprocessor searches a memory unit for stored information regarding the digital broadcast channel and determines the presence or absence of a lower adjacent NTSC channel. In the case a lower adjacent NTSC channel is present, the microprocessor shifts the frequency of the LO signal causing the IF signal to shift towards the lower band edge of a surface acoustic wave (SAW) filter present in a digital signal processor further attenuating the lower adjacent NTSC channel.

7 Claims, 2 Drawing Sheets

US 7,239,358 B1

TELEVISION RECEIVER FOR DIGITAL SIGNALS WITH OFFSET TUNING PROVISIONS

This application claims the benefit under 35 U.S.C. § 365 of International Application PCT/US00/19103, filed Jul. 13, 2000, which was published in accordance with PCT Article 21 (2) on Jan. 25, 2001 in English; and which claims benefit of U.S. provisional application Ser. No. 60/144,415 filed Jul. 16, 1999.

FIELD OF THE INVENTION

The invention generally relates to a digital television receiver. More particularly, the invention relates to an apparatus for selectively offsetting the frequency of a desired signal to obtain greater attenuation of undesired signals.

BACKGROUND OF THE DISCLOSURE

A Digital Television Standard published by the Advanced Television Subcommittee (ATSC) specifies vestigial sideband (VSB) signals for transmitting digital television (DTV) signals, such as high definition television (HDTV) signals. The VSB signals are transmitted in 6-MHz handwidth television channels such as those currently used in conventional terrestrial broadcasting of National Television Subcommittee (NTSC) analog television signals within the United States. The HDTV system is incompatible with the NTSC broadcast standard, thus, if the broadcasting industry immediately adopted the digital HDTV system and abandoned the NTSC system, NTSC television receivers purchased within the last few years would be rendered obsolete. To avoid this undesirable result, the transition from conventional analog NTSC-standard broadcasts to digital HDTV television broadcasts will occur over a period that may last fifteen years to allow for normal attrition of older NTSC television receivers. Thus, during this transition period, both NTSC analog and HDTV digital signals will occupy the television spectrum. Television receivers manufactured during the transition period will be capable of processing both NTSC and HDTV signals.

At particular geographic location, a receiver may receive signals from two transmitters that have adjacent channel spectrum allocations (e.g., an HDTV channel adjacent to an NTSC channel). When attempting to receive one of the signals (the desired signal), the other (the undesired, adjacent channel signal) creates interference in the system. Consequently, the signals must be filtered to reduce the interference from the adjacent channel signal. This situation is particularly problematic when the desired signal is an HDTV signal and the undesired signal is lower adjacent NTSC signal because of the proximity of the aural carrier of the NTSC signal to the digital signal. The desired to undesired (D/U) signal ratio can be more than −40 dB. This presents an extreme challenge to fabricate surface acoustic wave (SAW) filters, such as those required by digital television receivers, that have a steep transition band roll off in order to remove the undesired signal without significantly attenuating the desired signal.

Thus, there exists a need in the art for digital television receivers using conventional SAW filters that are able to reduce adjacent channel interference, particularly, lower adjacent NTSC channel interference.

SUMMARY OF THE INVENTION

The invention overcomes the disadvantages associated with the prior art by providing a television receiver for reducing adjacent channel interference when receiving digital signals. Specifically, the invention tunes to a digital signal associated with a selected broadcast channel and downconverts the digital signal to an intermediate frequency (IF) signal. The center frequency of the IF signal is determined by a microprocessor, which searches a memory unit for information associated with a selected broadcast channel and determines the presence or absence of a lower adjacent NTSC analog channel. In the case a lower adjacent NTSC analog channel is present, the microprocessor causes the IF signal to be shifted by 62.5 kHz. The IF signal is thus pushed further towards the band edge of the surface acoustic wave filter present in the digital signal processor, resulting in further attenuation of the lower adjacent NTSC signal, particularly the aural carrier of the NTSC signal.

In an alternative embodiment of the invention, the microprocessor determines the input signal power of the tuned digital signal using data obtained from an automatic gain control (AGC) circuit. If the microprocessor determines the input signal power is larger than that of the adjacent channel, the microprocessor does not cause the frequency of the IF signal to be shifted from nominal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
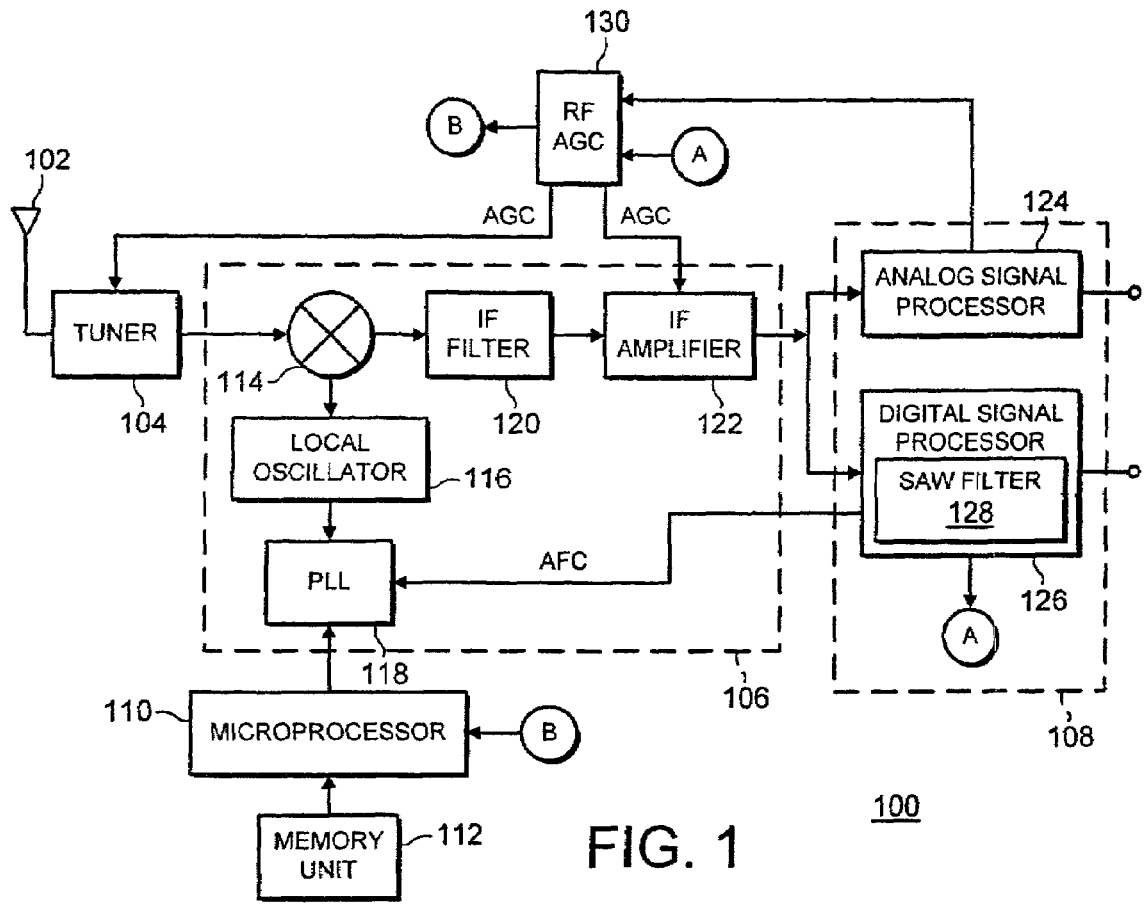
FIG. 1 depicts a block diagram of a television receiver in accordance with the present invention.

FIG. 1 depicts a block diagram of a television receiver 100 in accordance with the present invention. The receiver 100 comprises a tuner 104 coupled to an RF source 102, a frequency conversion stage 106, a demodulation stage 108, a microprocessor 110 coupled to a memory unit 112, and an automatic gain control (AGC) circuit 130. The tuner 104 selects the radio frequency (RF) signal corresponding to a broadcast channel selected from a plurality of channel locations in a frequency band provided by the RF source 102. The RF signals associated with broadcast channels are analog and digital television signals. The analog television signal may comprise a conventional National Television Standard Committee (NTSC) modulated signal within the United States. The digital television signal may comprise a Vestigial Sideband (VSB) modulated signal in compliance with the Advanced Television Systems Committee (ATSC) standard A/53, for example, a high definition television (HDTV) signal.

The frequency conversion stage 106 comprises a mixer 114, a local oscillator (LO) 116, a phase-locked loop (PLL) 118, an IF filter 120, and an IF amplifier 122. The mixer 114 is coupled to the tuner 104 and receives the RF signal. The LO 116 is also coupled to the mixer 114. The LO 116 generates a LO signal having either a nominal frequency corresponding to the selected broadcast channel or a frequency shifted upward from nominal by 62.5 kHz. The PLL 118 controls the frequency of the LO signal using feedback from the demodulation stage 108 and signals from the microprocessor 110. The PLL 118 causes the LO 116 to generate a nominal frequency when the microprocessor 110 determines the absence of a lower adjacent analog broadcast channel. The PLL 118 causes the LO 116 to generate a frequency shifted upward from nominal by 62.5 kHz when the microprocessor 110 determines the presence of a lower adjacent analog broadcast channel.

Figure 2A:
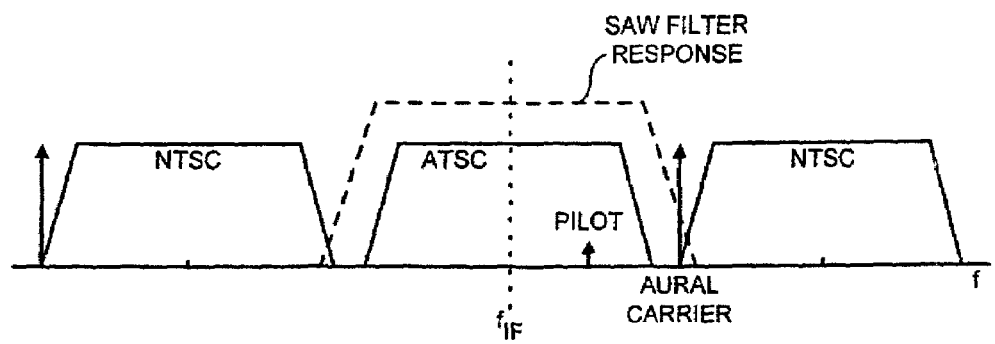
FIG. 2A illustrates an IF spectrum and SAW filter response before frequency shift.

The mixer 114 heterodynes the selected RF signal and the LO signal to produce a downconverted IF signal. The mixer 114 produces the sum and difference frequency products of the LO signal and the selected RF signal. The IF signal is coupled to the IF filter 120 that has a passband response selected to pass the difference frequency product of the LO signal and the selected RF signal. As shown in FIG. 2A, the spectrum of the filtered IF signal is a mirror image of the signal spectrum before downconversion. The IF amplifier is coupled to the IF filter and amplifies the IF signal for output to the demodulation stage 108.

When downconverting the selected RF signal, the frequency of the LO signal is determined using the following equation:

$$f_{LO} = f_c + f_{IF}$$

where $f_C$ is the center frequency of the selected RF signal. When the microprocessor 110 determines the presence of a lower adjacent analog broadcast channel, $f_{LO}$ is shifted upward from the nominal level by one 62.5 kHz (the resolution of the PLL 118). Thus, because the filtered IF signal is mirrored, the center frequency of the filtered IF signal, $f_{IF}$, is also shifted upward by 62.5 kHz. In the United States, $f_{IF}$ of the video carrier nominally 45.75 MHz for analog television signals and 44 MHz for digital television signals.

The demodulation stage 108 comprises an analog signal processor 124 and a digital signal processor 126 having a surface acoustic wave (SAW) filter 128. The analog signal processor 124 is coupled to the IF amplifier 122 and demodulates and processes the IF signal for output. The SAW filter 128 of the digital signal processor 126 is coupled to the IF amplifier 122. The SAW filter 128 has a center frequency $f_{IF}$ and has a passband designed to pass the inband digital signal and attenuate adjacent associated with both the upper and lower broadcast channels. The digital signal processor 126 is coupled to the SAW filter 128 and demodulates and processes the filtered IF signal for output.

The microprocessor 110 executes software stored in the memory unit 112 to determine if a lower analog signal adjacent the digital signal associated with the selected broadcast channel is present. Specifically, the microprocessor 110 searches the memory unit 112 for information regarding the selected broadcast channel. If the selected broadcast channel is a digital channel, the microprocessor 110 determines the presence or absence of a lower adjacent analog channel. When a lower adjacent analog channel is absent, the microprocessor causes the frequency of the LO signal to be nominal. When a lower adjacent analog channel is present, the microprocessor 110 causes the frequency of the LO signal to be shifted from nominal by 62.5 kHz.

In an alternative embodiment of the invention, the microprocessor 110 receives signals from the AGC circuit 130 regarding the signal power of the selected RF signal. When the signal power is comparable to that of the lower adjacent analog signal, the microprocessor 110 performs the frequency shifting operation. When the signal power is larger than that of the lower adjacent analog signal, the microprocessor 110 does not perform the frequency shifting operation.

FIG. 2 illustrates the operation of the present invention when the selected broadcast channel is associated with an HDTV signal and both upper and lower adjacent broadcast channels are associated with NTSC signals. FIG. 2A shows the spectrum of the downconverted HDTV signal with both upper and lower adjacent NTSC channels before the frequency shifting operation of the present invention. Because downconversion flips the spectrum of the IF signal, the lower adjacent NTSC signal has a higher center frequency than that of the selected HDTV signal. The dashed line indicates the frequency response of the SAW filter 128 of the digital signal processor 126. As shown, the aural carrier of the lower adjacent NTSC signal is within the passband of the SAW filter, which can cause interference in the demodulation and processing performed by the digital signal processor 126.

Figure 2B:
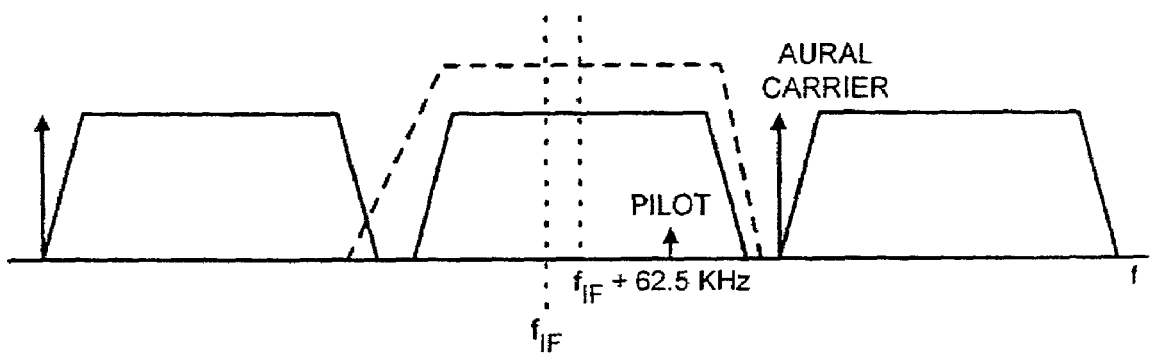
FIG. 2B illustrates an IF spectrum and SAW filter response after frequency shift.
Figure 3:
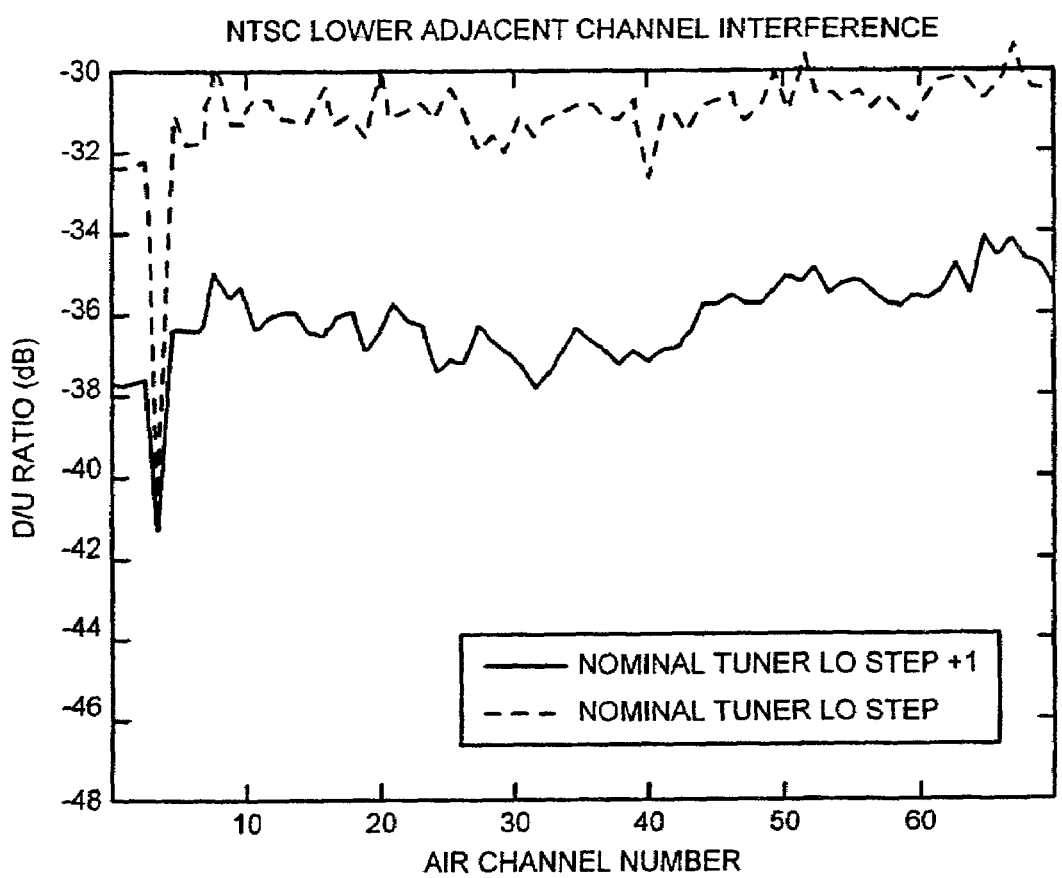
FIG. 3 illustrates the desired to undesired signal ratio for both nominal frequency and shifted frequency television signals.

FIG. 2B shows the spectrum of the downconverted HDTV signal with both the upper and lower adjacent channels after the frequency shifting operation of the present invention. As shown, $f_{IF}$ is shifted upward from nominal by 62.5 kHz thereby shifting the spectrum of the desired inband HDTV signal towards the upper band of the SAW filter 128. As a result, the aural carrier of the lower adjacent NTSC signal is shifted out of the passband of the SAW filter. FIG. 3 shows the effects of the present invention when receiving an HDTV signal in the presence of a lower adjacent NTSC signal for a plurality of broadcast channels.

Although various embodiments which incorporate the teachings of the present invention have been shown and described in detail herein, those skilled in the art may readily devise many other varied embodiments that still incorporate these teachings.

What is claimed is:

1. A television receiver for receiving a digital television signal susceptible to an interference caused by a lower adjacent analog television signal, said television receiver comprising:
   means for determining the presence of said interference;
   a tuner for receiving the digital signal associated with a broadcast channel selected from a plurality of channel locations in a frequency band;
   a frequency conversion stage, coupled to said tuner, for converting in frequency the digital signal to an intermediate frequency (IF) signal to be output, where the center frequency of said IF signal is capable of being switched to a nominal frequency corresponding to the selected broadcast channel or to a second frequency being shifted from said nominal frequency in accordance with the presence or absence of said interference determined by said determining means; and
   a filter, coupled to said frequency conversion stage, for attenuating adjacent signals, said filter having a center frequency equal to said nominal frequency and said second frequency being in the passband of said filter wherein the lower adjacent analog signal is further attenuated by said filter upon switching of the center frequency of IF signal to said second frequency.

2. The television receiver of claim 1 further comprising:
   a memory unit for storing software and information associated with each of the plurality of broadcast channels; and a microprocessor, coupled to said memory unit and said frequency conversion stage, for executing software stored in said memory unit, searching said memory unit for a lower analog signal adjacent to the digital signal, and causing the center frequency of said IF signal to be switched to either said nominal frequency or said second frequency;

where said microprocessor, in response to the absence of a lower analog signal adjacent to the digital signal, causes the center frequency of said IF signal to be switched to said nominal frequency;

said microprocessor, in response to the presence of a lower analog signal adjacent to the digital signal, causes the center frequency of said IF signal to be switched to said second frequency.

3. The television receiver of claim 1 wherein said frequency conversion stage comprises:

a local oscillator for generating a local oscillation signal;

a phase-locked loop, coupled to said local oscillator, for controlling the frequency of said local oscillation signal;

a mixer, coupled to said local oscillator, for heterodyning the digital signal with said local oscillation signal to generate said IF signal; and an IF filter, coupled to said mixer, for passing the lower band of said IF signal.

4. The television receiver of claim 1 wherein said second frequency is said nominal frequency shifted upward by 62.5 kHz.

5. The receiver of claim 1 further comprising:

an AGC circuit indicative of the power of the digital television signal, wherein the determining means determines the presence of the interference based on a comparison of said power with the power of the lower adjacent analog signal.

6. A method of receiving a digital television signal susceptible to an interference caused by a lower adjacent analog television signal comprising the steps of:

tuning a radio frequency (RF) signal having a digital signal inband and a lower adjacent analog signal;

determining the presence or absence of said interference;

offsetting the frequency of a local oscillator (LO) signal upon determination of the presence of said interference;

heterodyning said RF signal with said LO signal to generate a modified intermediate frequency (IF) signal having a frequency offset from nominal and within the passband of a filter; and filtering said modified IF signal with said filter to attenuate said lower adjacent analog signal.

7. The method of claim 6 wherein offsetting the frequency of said LO signal comprises shifting the frequency of said LO signal upward by 62.5 kHz.

* * * * *